United States Patent
Li et al.

(10) Patent No.: US 8,771,404 B2
(45) Date of Patent: Jul. 8, 2014

(54) HOLLOW CERAMIC FIBERS, PRECURSORS FOR MANUFACTURE THEREOF UTILIZING NANOPARTICLES, METHODS OF MAKING THE SAME, AND METHODS OF USING THE SAME

(75) Inventors: Tao Li, Garnet Valley, PA (US); Taekyu Kang, Newark, DE (US)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 333 days.

(21) Appl. No.: 13/194,990

(22) Filed: Jul. 31, 2011

(65) Prior Publication Data

US 2013/0025458 A1    Jan. 31, 2013

(51) Int. Cl.
- *B01D 69/08* (2006.01)
- *B01D 69/12* (2006.01)
- *B01D 53/22* (2006.01)
- *B29C 47/06* (2006.01)

(52) U.S. Cl.
USPC ............. 96/10; 96/8; 96/11; 95/54; 264/45.9; 264/122; 264/171.12; 264/634

(58) Field of Classification Search
USPC ......... 96/8, 10, 11; 95/45, 54, 55; 264/43, 44, 264/45.9, 109, 122, 171.12, 632, 634
See application file for complete search history.

(56) References Cited

U.S. PATENT DOCUMENTS

| | | | |
|---|---|---|---|
| 3,458,615 | A | 7/1969 | Bragaw, Jr. et al. |
| 4,493,629 | A | 1/1985 | Goffe |
| 5,085,676 | A | 2/1992 | Ekiner et al. |
| 5,799,960 | A | 9/1998 | Davis, Sr. |
| 6,875,528 | B1 | 4/2005 | Nagai et al. |
| 2006/0127656 | A1* | 6/2006 | Gallo et al. ................... 428/212 |
| 2009/0169884 | A1 | 7/2009 | Ekiner et al. |
| 2010/0018394 | A1 | 1/2010 | Ekiner et al. |
| 2013/0000488 | A1 | 1/2013 | Kratzer et al. |

FOREIGN PATENT DOCUMENTS

GB    830 441    3/1960

OTHER PUBLICATIONS

Othman, Mohd et al., "Single-step fabrication and characterisations of electrolyte/anode dual-layer hollow fibres for micro-tubular solid oxide fuel cells", Feb. 2010, Journal of Membrane Science, vol. 351, pp. 196-204.*

International Search Report and Written Opinion for PCT/US2012/044595, mailed Oct. 9, 2012.

(Continued)

*Primary Examiner* — Jason M Greene
(74) *Attorney, Agent, or Firm* — Christopher J. Cronin

(57) ABSTRACT

A composite hollow ceramic fiber includes a porous hollow core supporting a thin, dense sheath. The non-gas-tight core comprises a first ceramic material and an interconnecting network of pores. The gas-tight sheath comprises a second ceramic material. The fiber is made by extruding a core suspension of particles of the first ceramic material, a polymeric binder, and a solvent and a sheath suspension of particles of the second ceramic material, a polymeric binder and a solvent, respectively, from a spinnerette and coagulating the nascent hollow fiber to effect phase inversion of the polymeric binders. The resultant green fiber is sintered in a two step process. First, the binders are burned off. Second, the sheath is densified and the second ceramic material is sintered without fully sintering the first ceramic material. The first ceramic material of the core suspension has a median particle size greater than that of the second ceramic material of the sheath suspension.

26 Claims, 1 Drawing Sheet

(56) References Cited

OTHER PUBLICATIONS

International Search Report and Written Opinion for PCT/US2012/048947, mailed Oct. 9, 2012.

Othman, et al., "Single-step fabrication and characterisations of electrolyte/anode dual-layer hollow fibres for micro-tubular solid oxide fuel cells," Journal of Membrane Science, 351 (2010), pp. 196-204.

Wu, et al., "A dense oxygen separation membrane deriving from nanosized mixed conducting oxide," Journal of Membrane Science, 291 (2007), pp. 172-179.

Lopeandia, et al., "Size-dependent melting and supercooling of Ge nanoparticles embedded in a SIO2 thin film," Thermochimica Acta 461, (2007), pp. 82-87.

Sun, et al., "The melting behavior of aluminum nanoparticles," Thermochimica Acta, 463, (2007), pp. 32-40.

* cited by examiner

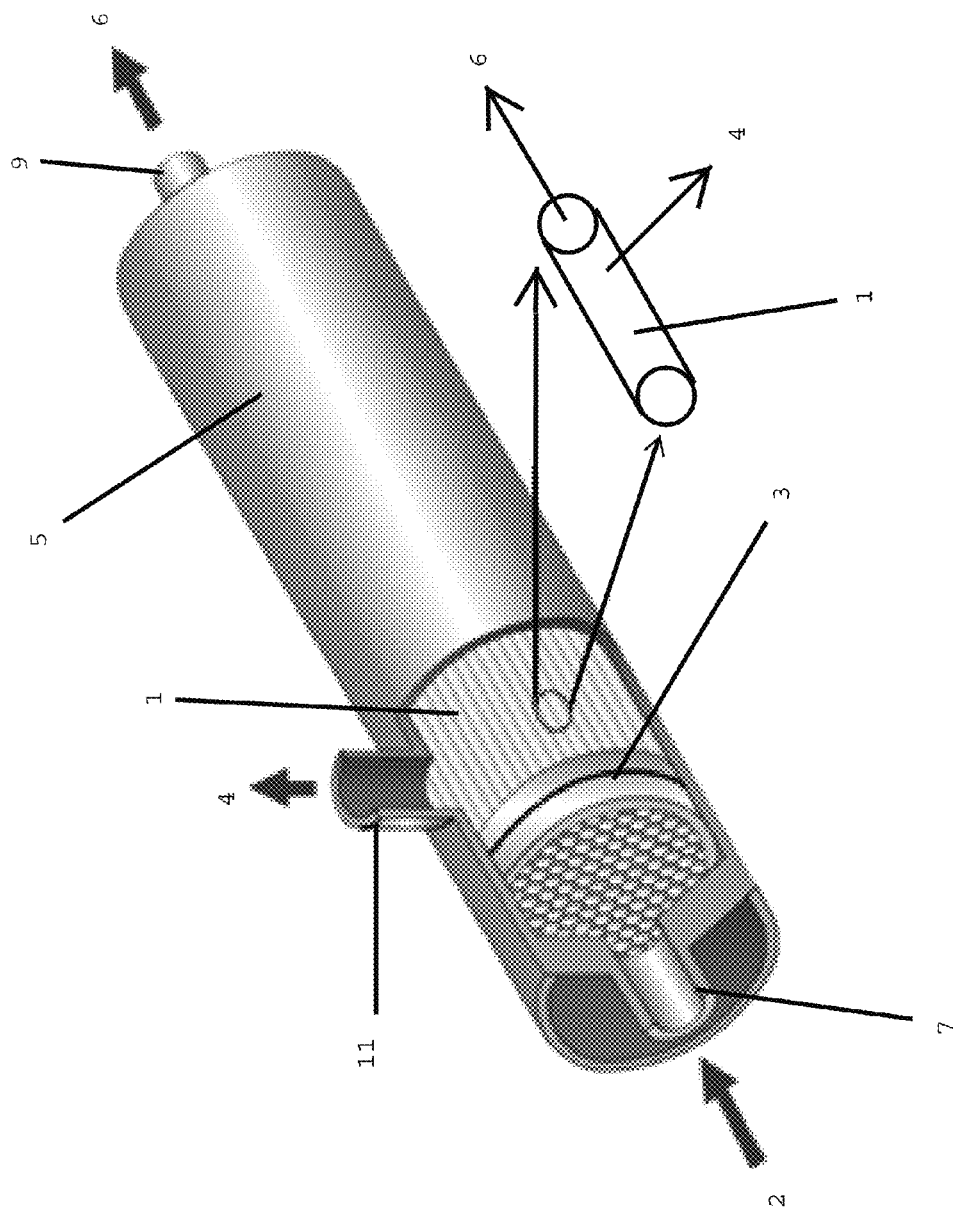

HOLLOW CERAMIC FIBERS, PRECURSORS FOR MANUFACTURE THEREOF UTILIZING NANOPARTICLES, METHODS OF MAKING THE SAME, AND METHODS OF USING THE SAME

CROSS-REFERENCE TO RELATED APPLICATIONS

None.

BACKGROUND

The use of membranes for separation of mixtures of liquids and gases is well-developed and commercially very important art. Such membranes are traditionally composed of a homogeneous, usually polymeric composition through which the components to be separated from the mixture are able to travel at different rates under a given set of driving force conditions, e.g. trans-membrane pressure and concentration gradients. Examples are the desalination of water by reverse osmosis, separation of water/ethanol mixtures by pervaporation, separation of hydrogen from refinery and petrochemical process streams, enrichment of oxygen or nitrogen from air, and removal of carbon dioxide from natural gas streams. In each separation, the membranes must withstand the conditions of the application, and must provide adequate flux and selectivity to be economically attractive.

One type of membrane that may be used to separate oxygen from non-oxygen gases or hydrogen from non-hydrogen gases is made of a solid electrolyte material. A solid electrolyte is an inorganic crystalline material that, while being impermeable to gases, has the property of conducting oxygen ions ($O^{2-}$) or protons ($H^+$) through voids in its crystalline structure. In order to maintain electric charge neutrality, certain solid electrolyte membranes must include a separate electron-conductive path. Other solid electrolyte membranes are made of materials that, at elevated temperatures, can simultaneously conduct oxygen ions and electrons or simultaneously conduct protons and electrons. Examples of these oxygen ion conductive materials include certain perovskites such as $La_xSr_{1-x}CoO_{3-y}$, $La_xSr_{1-x}FeO_{3-y'}$ and $La_xSr_{1-x}Fe_yCo_{1-y}O_{3-z}$ are examples of mixed conductors. One example of a proton conductive material is a cermet, a composite of metal and sintered ceramic. Other examples of proton conductive materials include the single-phase mixed metal oxide materials of the formula: $AB_{1-x}B'_xO_{3-y}$, wherein A is selected from Ca, Sr or Ba ions, B is selected from Ce, Tb, Pr, or Th ions, B' is selected from Ti, V, Cr, Mn, Fe, Co, Ni, Cu, Al, Ga, or In ions (or combinations thereof), x is greater than or equal to 0.02 and less than or equal to 0.5, and y is such that the electrical neutrality of the crystal lattice is preserved. These oxygen ion or proton conductive membranes are often called mixed oxide conducting membranes.

Other terms used to describe these membranes include mixed ion and electron(ic) conducting membranes, mixed proton and electron(ic) conducting membranes, ion transport membranes, oxygen transport membranes, hydrogen transport membranes, solid state membranes, mixed conducting metallic oxide, and mixed conducting multicomponent metallic oxide membranes. Regardless of the name utilized, these materials have the ability to transport oxygen ions ($O^{2-}$) or protons ($H^+$) through their crystalline structure.

Using oxygen conductive mixed oxide conducting membranes as an example, at elevated temperatures, the mixed oxide conducting material contains mobile oxygen ion vacancies that provide conduction sites for transport of oxygen ions through the material. At the surface of the membrane exposed to the higher $O_2$ partial pressure gaseous atmosphere, the molecular oxygen in the gaseous atmosphere adjacent the surface reacts with electrons and the oxygen vacancies in the crystalline structure of the material to product oxygen ions $O^{2-}$. The oxygen anions diffuse through the mixed conductor material to the opposite surface of the membrane exposed to the lower $O_2$ partial pressure. At the opposite surface, the oxygen anions give up their electrons and form molecular oxygen. The molecular oxygen then diffuses into the gaseous atmosphere adjacent the surface of the membrane exposed to the lower $O_2$ partial pressure gaseous atmosphere. These materials transport oxygen ions selectively, and assuming a defect-free membrane and lack of interconnecting pores, they can act as a membrane with an infinite selectivity for oxygen.

Proton conductive mixed oxide conducting membranes operate in much the same way. At the surface of the membrane exposed to the higher $H_2$ partial pressure gaseous atmosphere, hydrogen molecules disassociate into protons and electrons which migrate through the membrane to the opposite surface where they recombine into hydrogen molecules. The thus-formed hydrogen molecules then diffuse into the gaseous atmosphere adjacent the membrane surface. Similar to oxygen conducting mixed oxide conducting membranes, these proton conducting membranes offer the possibility of infinite selectivity for hydrogen.

Mixed oxide conducting membranes have been successfully made in flat or planar shapes and large cylindrical tubes (with outer diameters of greater than 1 cm), but have had limited commercial success because of their relatively low surface area compared to small-diameter (for example, an outer diameter/inner diameter of 670/490 microns) hollow fibers.

Large cylindrical tubes may be distinguished from small-diameter hollow fibers not only on the basis of size, but also in their manner of manufacture. Larger diameter tubes are typically made by extrusion through a die of, or cast from, a composition having a very high solids content and very low solvent/dispersant content. This is done in order to provide the rigidity necessary for such structures to avoid collapse after being extruded or being removed from the cast.

As an example of small-diameter hollow fibers, US 20090169884 discloses that they may be made by injection of a relatively high solvent content suspension (e.g. 10-33% or even 20-25% by weight of the suspension) through an annulus of a hollow fiber spinnerette and injection of a bore fluid from a bore on the inside of the spinnerette annulus. Preferred polymers are copolymers having both soft and hard segments. The nascent fiber is passed through a short air gap and directly into a coagulating fluid to facilitate phase change of the polymeric binder in the suspension. The coagulated fiber exhibits excellent processability and may be drawn and wound on a take-up roll, drum, spool, or bobbin.

During the production of mixed oxide conducting membranes, the unsintered, or "green", plate, tube, or fiber is subjected to a heat treatment to pyrolize the binder and sinter the ceramic material to yield a dense, monolithic structure of very low porosity. These fibers are variously described as non-porous or micro-porous. The degree of porosity may vary from across one surface of the membrane to the other, but the pores do not interconnect.

Mixed oxide conducting membranes can be placed in two major groups: those that conduct oxygen ions and those that conduct protons. Membranes from the first group are typically used to separate oxygen from gas mixtures containing oxygen or to produce oxygen for reaction with a feedstock, for example, light hydrocarbons such as methane, natural gas, or ethane. Membranes from the second group are typically used to separate hydrogen from gas mixtures containing hydrogen, such as syngas. Regardless of whether they conduct oxygen ions or protons, mixed oxide conducting membranes appear to be well suited for oxygen or hydrogen production or separations since they can be operated in a pressure driven mode. Thus, production of oxygen (or production of the reaction product of oxygen and light feedstock) or hydrogen is driven by the difference in the partial pressure of the gas of interest between the two sides of the membrane.

Mixed oxide conducting membranes must exhibit a variety of mechanical and physical properties in order to withstand handling during processing into gas separation modules and also provide a desirable operational lifetime while maintaining a suitable level of performance under operating conditions. More particularly, they should have sufficient strength to resist cracking during formation of the eventual gas separation module from the component fibers. Fibers of especially small diameters are especially susceptible to breaking during handling. They should also be capable of withstanding elevated pressure differentials and elevated oxygen, hydrogen, carbon monoxide, carbon dioxide, moisture, or other chemical conditions without significant loss in its oxygen ion or proton transport ability. However, mixed oxide conducting materials exhibit different degrees of these mechanical and physical properties. For example, many mixed oxide conducting materials exhibit excessive creep at elevated temperature which may cause the membrane to deform and ultimately crack under certain pressures.

Permeation of oxygen across a mixed oxide conducting membrane may be modeled upon the Wagner theory:

$$J_{O2} = \frac{RT}{4tn^2F^2} \frac{\sigma_e \sigma_I}{\sigma_e + \sigma_I} \text{Ln}(P_{1,O2}/P_{2,O2})$$

$$\text{Since } \sigma_e \gg \sigma_I, \frac{\sigma_e \sigma_I}{\sigma_e + \sigma_I} = \sigma_I$$

$$J_{O2} = \frac{\sigma_I RT}{4tn^2F^2} \text{Ln}(P_{1,O2}/P_{2,O2}) \propto \frac{\sigma_I T}{t}\text{Ln}(P_{1,O2}/P_{2,O2})$$

where $J_{O2}$ is the oxygen flux defined as flow rate per unit area, $\sigma_e$ and $\sigma_I$ are intrinsic electronic and ionic conductivity of the material, R is the ideal gas constant, T is the absolute temperature, L is the membrane thickness, n is the charge on the charge carrier (which in the case of oxygen ions is 2), F is Faraday's constant, $P_{1,O2}$ is the oxygen partial pressure at the feed side and $P_{2,O2}$ is the oxygen partial pressure on the permeate side. Permeation of hydrogen across a mixed oxide conducting membrane may be derived from the above equation with substitution with an appropriate n and hydrogen partial pressures.

As seen in the above derivation, flux is directly proportional to ion conductivity, operating temperature and pressure ratio while it is inversely proportional to membrane thickness. Thus thinner films could lead to higher oxygen fluxes, reduced surface areas, lower operating temperatures, and smaller oxygen partial pressure differentials across the mixed conductor material.

Although mixed oxide conducting membranes present the possibility for infinite selectivity, there is a tradeoff between flux and mechanical strength. As the thickness of the mixed oxide conducting material is decreased, the mechanical strength correspondingly decreases. Because a mixed oxide conducting membrane must possess a minimum amount of strength to withstand manufacture, handling, and operation (especially in reactive environments), there is a limit to how much the thickness may be decreased. On the other hand, as the thickness is increased in order to provide the necessary mechanical strength, flux suffers.

Wu, et al. fabricated densified oxygen separation membranes from nano size $SrCo_{0.4}Fe_{0.5}Zr_{0.1}O_{3-\delta}$ (SCFZ) powders synthesized via a flame aerosol synthesis (FAS) method and densified oxygen separation membranes from SCFZ powders synthesized by the traditional solid-state reaction (SSR) method. Z. Wu, X. Dong, W. Jin, Y. Fan, N. Xu, "*A Dense Oxygen Separation Membrane Deriving From Nano-sized Mixed Conducting Oxide*", Journal of Membrane Science 291 (2007) 172-179. This was done by uniaxially pressing the powders separately into 16 mm disks followed by sintering and polishing to a desired thickness. The crystal structure, morphology, oxygen desorption property and oxygen non-stoichiometry of the monolithic membranes were characterized. Compared with SCFZ synthesized by the SSR method, the densification temperature of SCFZ membranes was reduced and the oxygen permeation flux was increased by 40% at the elevated temperatures (1,073-1,223° K) when SCFZ-FAS powders were used as the starting material. However, because the membranes were produced by polishing sintered disks made from uniaxially pressed FAS powder, a relative great thickness (0.8 mm) resulted.

The thickness of the separation layer thickness can be reduced by increasing the porosity asymmetry of a monolithic fiber. In all-polymeric fibers hollow fibers, a desired degree of asymmetry across the thickness of the fiber wall can be adjusted in a complex manner by varying the content of the bore fluid, the content of the coagulant, the solvent content of the dope formulation, and the residence time of the nascent fiber in the coagulation bath. The degree to which this technique is effective is based upon the baseline asymmetry. However, this approach is limited in application to hollow fibers made of a matrix of polymer and ceramic particles. This is because such composite fibers have a baseline degree of porosity asymmetry that is relatively lower than that of all-polymer fibers due to their lower polymeric binder and solvent content and because the suspended perovskite particles in the dope do not contribute to the structural asymmetry during phase inversion. Thus, it is difficult to control the thickness of the densified layer. As a result, the thickness (and resultant overall flux) of the separation layer is difficult to precisely controlled.

The thickness of the separation layer can also be reduced by using a two-layered composite fiber produced by the spin dope technique such as that disclosed in U.S. patent application Ser. No. 13/174,682 filed on Jun. 30, 2011. In that method, the spinnerette is modified to form a thin sheath and a thick core. A core has an interconnecting network of pores while the sheath is gas-tight. These differing morphologies are produced by using a first ceramic compound with a higher melting point in the core and a second ceramic compound with a lower melting point in the sheath. The composite fiber is sintered under conditions sufficient to densify the sheath while retaining the interconnecting network of pores in the core. However, this approach requires the ceramic compound in the core dope to have a higher melting point than that in the sheath dope.

Thus, it is an object of the invention to provide a solid state electrolyte membrane that exhibits both satisfactory flux and mechanical strength. It is a further object of the invention to provide greater control over the thickness of the separation layer. It is a still further object of the invention to provide greater freedom in selecting the ceramic compound for use in the separation layer.

SUMMARY

There is disclosed a process for making a composite hollow fiber that comprises the following steps. A core suspension is prepared comprising a first polymeric binder, a first particulate ceramic material, and a first solvent. A sheath suspension is prepared comprising a second polymeric binder, a second particulate ceramic material, and a second solvent. A spinnerette is provided that is adapted and configured to continuously extrude one or more nascent hollow fibers, wherein each of the nascent hollow fibers comprises a hollow core formed from the core suspension and a sheath surrounding the core formed from the sheath suspension. The nascent hollow fiber is immersed in a liquid coagulant to facilitate phase inversion of the first and second polymeric binders. The second particulate ceramic material comprises a mixed oxide conductor. The second particulate ceramic material has a median particle size less than that of the first particulate ceramic material. The first and second particulate ceramic materials are chemically identical or different. The first and second solvents are the same or different. The first and second polymeric binders are the same or different.

There is also disclosed a composite hollow fiber produced by the above-described process for making a composite hollow fiber.

There is also disclosed a method of making a composite hollow ceramic fiber that comprises the following steps. The above-described composite hollow fiber is heated under conditions sufficient to drive off the first and second polymeric binders. The binderless composite hollow fiber is heated under conditions sufficient to densify the sheath to gas-tightness and sinter the second particulate ceramic material but not fully sinter the core.

There is also disclosed a composite hollow ceramic fiber produced by the above-described method of making a composite hollow ceramic fiber.

Each of the process, composite hollow fiber, method, and composite hollow ceramic fiber may include one or more of the following aspects:
- the second particulate ceramic material in the sheath suspension has a median particle size of less than 100 nm.
- the second particulate ceramic material in the sheath suspension has a median particle size of no greater than 75 nm.
- the first and second particulate ceramic materials are chemically identical.
- the core suspension further comprises an amount of the second particulate ceramic material.
- the second particulate ceramic material of the core suspension has a median particle size greater than that of the second particulate ceramic material of the sheath suspension such that the second particulate ceramic material of the sheath suspension is sinterable at a temperature less than that of the second particulate ceramic material of the core suspension.
- the median particle size of the first particulate ceramic material of the core suspension is no less than 100 nm.
- the median particle size of the second particulate ceramic material of the core suspension is no less than 100 nm; and
- the median particle size of the second particulate ceramic material of the sheath suspension is no greater than 75 nm.
- the sheath suspension further comprises an amount of the first particulate ceramic material;
- the first particulate ceramic material of the sheath suspension has a median particle size less than that of the first particulate ceramic material of the core suspension such that the first particulate ceramic material of the sheath suspension is sinterable at a temperature less than that of the first particulate ceramic material of the core suspension.
- the median particle size of the first particulate ceramic material of the core suspension is no less than 100 nm;
- the median particle size of the first particulate ceramic material of the sheath suspension is no greater than 75 nm; and
- the median particle size of the second particulate ceramic material of the sheath suspension is no greater than 75 nm.
- the core suspension further comprises an amount of the second particulate ceramic material;
- the sheath suspension further comprises an amount of the first particulate ceramic material;
- the first particulate ceramic material of the sheath suspension has a median particle size less than that of the first particulate ceramic material of the core suspension such that the first particulate ceramic material of the sheath suspension is sinterable at a temperature less than that of the first particulate ceramic material of the core suspension; and
- the second particulate ceramic material of the core suspension has a median particle size greater than that of the second particulate ceramic material of the sheath suspension such that the second particulate ceramic material of the sheath suspension is sinterable at a temperature less than that of the second particulate ceramic material of the core suspension.
- the median particle sizes of the first and second particulate ceramic materials of the core suspension is no less than 100 nm; and
- the median particle size of the first and second particulate ceramic materials of the sheath suspension is no greater than 75 nm.
- the sheath suspension comprises about 64 wt. % to about 80 wt. % of the particles of the second particulate ceramic material and about 8 wt. % to about 12 wt. % of the second polymeric binder.
- the nascent hollow fiber is passed from the spinnerette through an air gap.
- the core suspension further comprises pore formers insoluble in the first solvent.
- the mixed oxide conductor comprises a hydrogen conducting mixed oxide conductor.
- the mixed oxide conductor is an oxygen conducting mixed oxide conductor.
- the oxygen conducting mixed oxide conductor is a perovskite independently selected from formula (I):

$$[Ma_{1-x-u}Ma'_xMa''_u][Mb_{1-y-v}Mb'_yMb''_v]O_{3-\delta} \quad (I)$$

in which:
Ma represents an atom chosen from scandium, yttrium, or from the families of lanthanides, actinides or alkaline-earth metals;
Ma', which is different from Ma, represents an atom chosen from scandium, yttrium or from the families of lanthanides, actinides or alkaline-earth metals;
Ma", which is different from Ma and Ma', represents an atom chosen from aluminum (Al), gallium (Ga), indium (In), thallium (Tl) or from the family of alkaline-earth metals;
Mb represents an atom chosen from transition metals;
Mb', which is different from Mb, represents an atom chosen from transition metals, aluminum (Al), indium (In), gallium (Ga), germanium (Ge), antimony (Sb), bismuth (Bi), tin (Sn), lead (Pb) and titanium (Ti);

Mb", which is different from Mb and Mb', represents an atom chosen from transition metals, alkaline-earth metals, aluminum (Al), indium (In), gallium (Ga), germanium (Ge), antimony (Sb), bismuth (Bi), tin (Sn), lead (Pb) and titanium (Ti);

$0 < x \le 0.5$;
$0 \le u \le 0.5$;
$(x+u) \le 0.5$;
$0 \le y \le 0.9$;
$0 \le v \le 0.9$;
$0 \le (y+v) \le 0.9$; and w is such that the structure in question is electrically neutral.

the second particulate ceramic material is $La_{1-x}Sr_xFe_{1-y}CO_yO_{3-\delta}$.

the second particulate ceramic material is $La_{0.7}Sr_{0.3}Fe_{0.8}Co_{0.2}O_{3-\delta}$ or $La_{0.6}Sr_{0.4}Fe_{0.8}Co_{0.2}O_{3-\delta}$.

each of the first and second particulate ceramic materials is a perovskite independently selected from formula (I):

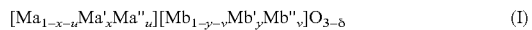

$$[Ma_{1-x-u}Ma'_xMa''_u][Mb_{1-y-v}Mb'_yMb''_v]O_{3-\delta} \qquad (I)$$

in which:

Ma represents an atom chosen from scandium, yttrium, or from the families of lanthanides, actinides or alkaline-earth metals;

Ma', which is different from Ma, represents an atom chosen from scandium, yttrium or from the families of lanthanides, actinides or alkaline-earth metals;

Ma", which is different from Ma and Ma', represents an atom chosen from aluminum (Al), gallium (Ga), indium (In), thallium (Tl) or from the family of alkaline-earth metals;

Mb represents an atom chosen from transition metals;

Mb', which is different from Mb, represents an atom chosen from transition metals, aluminum (Al), indium (In), gallium (Ga), germanium (Ge), antimony (Sb), bismuth (Bi), tin (Sn), lead (Pb) and titanium (Ti);

Mb", which is different from Mb and Mb', represents an atom chosen from transition metals, alkaline-earth metals, aluminum (Al), indium (In), gallium (Ga), germanium (Ge), antimony (Sb), bismuth (Bi), tin (Sn), lead (Pb) and titanium (Ti);

$0 \le x \le 0.5$;
$0 \le u \le 0.5$;
$(x+u) \le 0.5$;
$0 \le y \le 0.9$;
$0 \le v \le 0.9$;
$0 \le (y+v) \le 0.9$; and w is such that the structure in question is electrically neutral.

the core suspension further comprises pore formers having a particle size of 5 to 50 μm.

the composite hollow fiber has an outer diameter of 150-6,000 μm, an inner diameter of 50-2,000 μm, a core thickness of 50-2,000 μm, and a sheath thickness of 3-70 μm.

the composite hollow fiber has an outer diameter of 1,300-2,850 μm and a combined core and sheath thickness of 260-1,000 μm.

an outside diameter of the composite hollow ceramic fiber is in a range from about 900 to 2,000 μm and a ratio of the outside diameter of the composite hollow ceramic fiber to an inside diameter of the composite hollow ceramic fiber is in a range of from about 1.20:1.0 to about 3.0:1.0 the core has an interconnecting network of pores.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

The FIGURE is a schematic of a gas separation module utilizing the composite hollow fibers of the present invention.

DESCRIPTION OF PREFERRED EMBODIMENTS

The composite hollow ceramic fiber of the present invention includes a sheath portion surrounding a hollow core portion. A bore extends axially through the core portion.

The core portion has an interconnecting network of pores and is not gas-tight. It is made up of a first ceramic material and optional additional ceramic materials. The relatively high porosity of the core portion allows relatively high flux between the outer and inner surfaces of the core portion without a significant decrease in the driving force partial pressure.

In contrast, the sheath portion is dense and relatively non-porous and is gas-tight. While the sheath is typically fully densified and void-free, it may have a relatively low degree of porosity yet still remain gas-tight. It is made up of a second ceramic material which is a mixed oxide conducting material and optional additional ceramic materials. Because it is a mixed oxide conducting material, at elevated temperatures, the second ceramic material has the property of conducting oxygen ions or protons between its surfaces based upon the difference in partial pressures of the gas of interest between the two membrane sides. Due to the gas-tightness of the sheath and the oxygen ion or proton conducting properties of the second ceramic material, the sheath provides a gas separation layer of near-infinite, if not infinite, selectivity.

The core and sheath work in tandem to provide a sufficiently high flux of oxygen or hydrogen across the membrane.

The presence of the interconnecting network of pores in the core allows molecular oxygen or molecular hydrogen to flow through the network of pores. Due to this mechanism, the core should not present much resistance to the oxygen or hydrogen flow. Acting as the support for the sheath, the core is formed with a thickness sufficient to provide a mechanical strength suitable for withstanding processing and operation.

While the sheath may contain a certain degree of porosity, the pores do not interconnect to establish an open path through which molecular oxygen or hydrogen may flow. Thus, the sheath is gas-tight. Because the flux of oxygen or hydrogen across the membrane is highly dependent upon the thickness of the sheath, a relatively thin sheath is formed on the core.

Typically, the composite hollow ceramic fiber has an outer diameter of 105-4,200 μm, and inner diameter of 35-1,400 μm, a core thickness of 35-1,400 μm, and a sheath thickness of 2-50 μm.

Because the core is not gas-tight and the sheath is, the relatively small sheath thickness can yield impressive improvements in flux compared to conventional monolithic hollow ceramic fibers without sacrificing fiber strength. US 20100018394 discloses the preparation of monolithic hollow ceramic fibers having an outer diameter of 670 μm and an inner diameter of 490 μm, to yield a wall thickness of 180 μm. One may recall the equation described above that is derived from the model based upon the Wagner theory where flux is inversely proportional to the thickness of the membrane $$J_{O2} = \frac{\sigma_I RT}{4tn^2 F^2} \mathrm{Ln}(P_{1,O2}/P_{2,O2}) \propto \frac{\sigma_I T}{t} \mathrm{Ln}(P_{1,O2}/P_{2,O2})$$

One of ordinary skill in the art will recognize that the permeation of hydrogen across the membrane may be derived from the above equation with substitution of an appropriate n and hydrogen partial pressures.

With insertion of constants for $\sigma_1$, T, $P_{1,O2}$, and $P_{2,O2}$, the flux is proportional to 1/t or 1/180 μm. In contrast, because the core of the inventive fiber is not gas-tight, the flux of the inventive fiber is proportional to ½-50 μm. Even with a conservatively estimated sheath thickness of 40-50 μm, this represents a 360% to 450% theoretical increase in flux for the inventive fiber in comparison to the conventional fiber of US 20100018394. Because the overall wall thickness of the inventive fiber (core thickness plus sheath thickness) is comparable to that of the conventional fiber, the strength of the inventive fiber is not significantly impacted.

More typically, the composite hollow ceramic fiber has an outer diameter of 1,000-2,000 μm and a combined core and sheath thickness of 200-700 μm. A ratio of the outside-diameter of the composite hollow ceramic fiber to the inside-diameter is in a range of from about 1.20:1.0 to about 3.0:1.0.

Thus, the combination of the relatively thicker, porous, and non-gas-tight core and the thin, dense, gas-tight sheath allows a sufficiently high level of flux without sacrificing mechanical strength. This feature of the invention provides a decided advantage over conventional monolithic hollow fiber membranes made of mixed oxide conducting ceramics that do not exhibit such a significant morphological difference between layers. In order to match the flux of the oxygen or hydrogen across the membrane of the invention, the wall thickness of such monolithic fibers (formed from, for example, the second ceramic material) would need to be reduced to such a small level that the resultant fiber might no longer have the requisite strength to resist breaking or cracking during processing or operation. On the other hand, if such hypothetical monolithic fibers were formed with a wall thickness having the requisite strength, the flux of the oxygen or nitrogen across such a membrane would be undesirably low in comparison to the inventive fiber.

The different morphologies of the core and sheath (interconnecting network of pores in the core and dense, gas-tight layer of the sheath) may be produced by a two-step process.

First, green (unsintered) composite hollow fiber (made of a matrix of ceramics and binder) is heated under conditions sufficient high to drive off or pyrolize the binder and any optional pore formers present but not substantially sinter the first or second ceramic material. The burning off of the binder and optional pore formers creates a relatively high degree of porosity in the sheath and the core. More particularly, the pores are interconnected so that neither the sheath nor the core is gas-tight.

Second, the binderless green fiber is heated under conditions sufficient to sinter and densify the sheath but not fully sinter the core. These conditions are satisfied by any one of five embodiments:

1) a core and a sheath made of the second ceramic materials
2) a core made of the first ceramic material and a sheath made of the second ceramic material
3) a core made of the first ceramic material and a sheath made of both the first and the second ceramic materials
4) a core made of both the first and the second ceramic materials and a sheath made of the second ceramic materials
5) a core made of both the first and second ceramic material and a sheath made of both the first and second ceramic material.

In the first embodiment, the core and the sheath each are made of the second ceramic material. However, the relatively small median particle size of the second ceramic material in the sheath causes outer surfaces of the particles of the second ceramic material in the sheath to begin to melt at temperatures under which no corresponding melting of particles of the second ceramic material in the core occurs. The mechanism underlying this result is the depression in melting temperature that is exhibited by relatively small particles in comparison to the melting temperature of the material in its bulk form. Because the particles of the second ceramic material in the sheath may be fully sintered and densified to gas-tightness at a temperature at which the particles of the second ceramic material in the core are less than fully sintered and not densified to gas-tightness, the sheath may be densified and rendered gas-tight while the interconnecting network of pores in the core is retained.

In the second embodiment, the core is made of the first ceramic material while a sheath made of the second ceramic material. The first and second ceramic materials are not chemically identical. This means that they are characterized by different chemical formulae. The relatively small median particle size of the second ceramic material in the sheath causes outer surfaces of the particles of the second ceramic material in the sheath to begin to melt at temperatures under which no corresponding melting of particles of the second ceramic material in the core occurs. Because the particles of the second ceramic material in the sheath may be fully sintered and densified to gas-tightness at a temperature at which the particles of the second ceramic material in the core are less than fully sintered and not densified to gas-tightness, the sheath may be densified and rendered gas-tight while the interconnecting network of pores in the core is retained.

In the second embodiment, the second ceramic material typically has a bulk melting temperature lower than that of the first ceramic material. One of ordinary skill in the art will recognize that materials in bulk form have melting temperatures much higher than those materials when present in the form of small particles. If the median particle size of the second ceramic material is sufficiently small and the median particle size of the first ceramic material is sufficiently great, the second ceramic material may even have a bulk melting temperature higher than that of the first ceramic material. For example, if the second ceramic material has a bulk melting temperature 50° C. higher than that of the first ceramic material, a particle size of 75 nm or lower can depress the bulk melting temperature by as much as 100° C. In this particular case, the median particle size of the first ceramic material would be greater than 100 nm. For any given pair of first and second ceramic materials, one of ordinary skill in the art may easily determine the bulk melting temperatures in routine fashion using a furnace and a densitometer. One of ordinary skill in the art may similarly determine in routine fashion whether a given second step processing temperature will result in sintering of the sheath and less than fully sintering of the core. This may be done by producing sintered fibers only made of core and sintered fibers of core/sheath. If the core-only fiber is non-gas-tight but the core/sheath fiber is gas-tight, then the sheath sintering and less than full sintering of the core may be confirmed. This conformation may also be buttressed by imaging the inventive sintered fiber with a scanning electron microscope.

In the third embodiment, the core is made of the first ceramic material and the sheath is made of both the first and the second ceramic materials. The first and second ceramic materials are not chemically identical. The relatively small median particle size of the first and second ceramic materials in the sheath causes outer surfaces of the particles of the first and second ceramic materials in the sheath to begin to melt at temperatures under which no corresponding melting of particles of the first ceramic material in the core occurs. Because the particles of the first and second ceramic materials in the sheath may be fully sintered and densified to gas-tightness at a temperature at which the particles of the first ceramic material in the core are less than fully sintered and not densified to gas-tightness, the sheath may be densified and rendered gas-tight while the interconnecting network of pores in the core is retained.

In the third embodiment, the second ceramic material typically has a bulk melting temperature lower than that of the first ceramic material. However, if the median particle size of the second ceramic material is sufficiently small and the median particle size of the first ceramic material in the core is sufficiently great, the second ceramic material may even have a bulk melting temperature higher than that of the first ceramic material. For example, if the second ceramic material has a bulk melting temperature 50° C. higher than that of the first ceramic material, a particle size of 75 nm or lower for the second ceramic material in the sheath can depress the bulk melting temperature by as much as 100° C. In this particular case, the median particle size of the first ceramic material in the core would be greater than 100 nm.

In the fourth embodiment, the core is made of both the first and the second ceramic material while the sheath made of the second ceramic material. The first and second ceramic materials are not chemically identical. The relatively small median particle size of the second ceramic material in the sheath causes outer surfaces of the particles of the second ceramic material in the sheath to begin to melt at temperatures under which no corresponding melting of particles of the first and second ceramic materials in the core occurs. Because the particles of the second ceramic material in the sheath may be fully sintered and densified to gas-tightness at a temperature at which the particles of the first and second ceramic materials in the core are less than fully sintered and not densified to gas-tightness, the sheath may be densified and rendered gas-tight while the interconnecting network of pores in the core is retained.

In the fourth embodiment, the second ceramic material typically has a bulk melting temperature lower than that of the first ceramic material. However, if the median particle size of the second ceramic material in the sheath is sufficiently small and the median particle sizes of the first and second ceramic materials in the core are sufficiently great, the second ceramic material may even have a bulk melting temperature higher than that of the first ceramic material. For example, if the second ceramic material has a bulk melting temperature 50° C. higher than that of the first ceramic material, a particle size of 75 nm or lower for the second ceramic material in the sheath can depress the bulk melting temperature by as much as 100° C. In this particular case, the median particle sizes of the first and second ceramic materials in the core would be greater than 100 nm.

In the fifth embodiment, the core is made of both the first and second ceramic materials and the sheath is also made of both the first and second ceramic materials. The first and second ceramic materials are not chemically identical. The relatively small median particle sizes of the first and second ceramic materials in the sheath causes outer surfaces of the particles of the first and second ceramic materials in the sheath to begin to melt at temperatures under which no corresponding melting of particles of the first and second ceramic materials in the core occurs. Because the particles of the first and second ceramic materials in the sheath may be fully sintered and densified to gas-tightness at a temperature at which the particles of the first and second ceramic materials in the core are less than fully sintered and not densified to gas-tightness, the sheath may be densified and rendered gas-tight while the interconnecting network of pores in the core is retained.

In the fifth embodiment, the second ceramic material typically has a bulk melting temperature lower than that of the first ceramic material. However, if the median particle size of the second ceramic material in the sheath is sufficiently small and the median particle sizes of the first and second ceramic materials in the core are sufficiently great, the second ceramic material may even have a bulk melting temperature higher than that of the first ceramic material. For example, if the second ceramic material has a bulk melting temperature 50° C. higher than that of the first ceramic material, a particle size of 75 nm or lower for the second ceramic material in the sheath can depress the bulk melting temperature by as much as 100° C. In this particular case, the median particle sizes of the first and second ceramic materials in the core would be greater than 100 nm.

One of ordinary skill in the art will recognize that application of the above feature of the invention (smaller particle size for the ceramic material(s) in the sheath) may be applied to embodiments including three or more ceramic materials in the core and/or three or more ceramic materials in the sheath. The common feature is that the sheath may be sintered and densified at a temperature at which the core is not fully sintered through the use of relatively smaller median particle sized ceramic materials in the sheath.

Formation of the Hollow Ceramic Fibers

Typically, the hollow ceramic fibers of the present invention are made according to the following steps. A core suspension is prepared that includes a ceramic material in particulate form, a polymeric binder, a solvent for the polymeric binder, and optionally one or more additives such as a pore former and/or a dispersing agent. A sheath suspension is also prepared that includes the same or different ceramic material in particulate form, a polymeric binder, a solvent for the polymeric binder, and optionally one or more additives such as a dispersing agent. The core and sheath suspensions are continuously extruded as nascent hollow fibers from a spinnerette.

Numerous spinnerette assemblies have been devised for the production of multi-component hollow fibers of the sheath/core type. Particularly, devices have been proposed for ensuring uniform supply of homogeneous fiber-forming liquid core and sheath suspension separately to the orifices of a spinnerette with the object of producing hollow fibers identical dimensions having a core formed from the core suspension and a sheath surrounding the core formed from the sheath suspension. These spinnerettes use a means for supplying the bore fluid positioned in the spinning orifice for forming the hollow fiber. Usually, a tube is used for this purpose and a bore fluid is injected from the tube into the bore of the fiber being formed to maintain the shape of the fiber until the polymeric materials making up the fiber are coagulated or solidified. Typical spinnerette assemblies are described by UK 830,441, U.S. Pat. Nos. 3,458,615, 4,493,629, and U.S. Pat. No. 5,799,960, the contents of which are incorporated herein in their entirety.

Regardless of the particular spinnerette used, the sheath suspension is extruded as a thin annulus from a circumferential portion of the spinnerette die to form the nascent sheath. The core suspension is extruded as a thick annulus within the thin annulus of the extruded sheath suspension and surrounding the tube from which bore fluid is injected. Bore fluid injected through this tube forms a continuous fluid stream within the bore of the nascent core. The bore fluid is preferably water, but a mixture of water and an organic solvent (for example NMP) may be used as well.

Typical spinning and downstream processing techniques are disclosed by US 2010/0018394 A1, the contents of which are incorporated herein in their entirety.

The nascent hollow fiber is passed from the spinnerette through an air gap and then immersed in a liquid coagulant to facilitate phase inversion. The fiber is then withdrawn from the coagulant and typically wound onto a take-up roll. The wound fiber may then be washed to remove residual solvent. Finally, the washed fiber may be dried to remove volatile material.

Typically, the dried, unsintered composite hollow fiber has an outer diameter of 150-6,000 μm, and inner diameter of 50-2,000 μm, a core thickness of 50-2,000 μm, and a sheath thickness of 3-70 μm. More typically, the dried, unsintered composite hollow fiber has an outer diameter of 1,300-2,850 μm and a combined core and sheath thickness of 260-1,000 μm.

Polymeric Binders

Suitable types of binders for use in the core and sheath suspensions include any of the polymers used in the art of hollow fiber-based gas separation membranes. The binder of the core suspension may be the same as or different from the binder of the sheath suspension. Often, the binders are the same. Typically, the polymeric binders are glassy polymers. Especially typical binders are those disclosed in US 20100018394, the disclosure of which is incorporated herein in its entirety. The binders of US 201000018394 include certain soft-segment/hard-segment copolymers. A "soft segment" is defined as any monomer that can be used to synthesize a homopolymer exhibiting a glass transition temperature, $T_g$-soft, in the range from −60 to +10° C. wherein such homopolymers would act as elastomers at temperatures above $T_g$-soft. A "hard segment" is defined as any monomer that can be used to synthesize a homopolymer exhibiting a glass transition temperature, $T_g$-hard, above +40° C., wherein such homopolymers would act as a hard glassy material below $T_g$-hard. The percentage by weight of soft-segments present in the copolymer is preferably in the range of 50-95%, and most preferably in the range of 60-90%.

A non-limiting list of the soft-segment/hard-segment copolymers includes: poly(ether)urethane-block-polyurethane block copolymers, poly(ether)urethane-block-polyurea block copolymers, poly(ester)urethane-block-polyurethane block copolymers, and poly(ester)urethane-block-polyurea block copolymers. One of ordinary skill in the art will recognize that a block copolymer consists of two or more chemically distinct macromolecular portions (i.e., blocks) joined together to form a single macromolecule.

The following commercially available block copolymers suitable as the polymeric binder include the following: Lycra L-162 from DuPont, Elastollan 1180A from BASF, Estane 5714 from Noveon, Estane 5708 from Noveon. Another suitable polymeric binder is polyethersulfone (PESf) preferably dissolved in 1-methyl-2-pyrrolidinone (NMP) or dimethylsulfoxide (DMSO) and optionally including a surfactant dispersant and/or poly(vinylpyrrolidone (PVP).

Solvent and Pore Formers

The solvents for use in the core and sheath suspensions are used for dissolving the respective binder. While different solvents may be used in the two suspensions, typically they are the same. The solvent in question should readily dissolve the respective binder, should provide a stable suspension of the ceramic particles, and should be compatible with the overall fiber spinning process. Solvents such as N-methylpyrrolidone (NMP), N,N-dimethylacetamide (DMAC), N,N-dimethylformamide (DMF), dimethyl sulfoxide (DMSO), gamma-butyrolactone (BLO) and glycol ethers or esters are particularly useful with the polymers of this invention.

If the polymeric binder in the core of the green fiber does not produce enough porosity upon burn-off, or if the thus-formed pores collapse during post-burn-off sintering to yield no interconnecting network of pores, pore formers may be included in the core suspension. The pore formers are insoluble in the solvent. Typically, the pore formers are polymeric materials. These polymeric materials typically are burned off later at temperatures higher than that of the binder. Thus, they form pores closer in time to the sheath densification and thus are more likely to withstand pore collapse in comparison to the binder polymers that are driven off earlier in the heat treatment process and which may collapse prior to sheath densification. The pore formers generally have a particle size of 5 to 50 μm. During burn-off, they create voids of a sufficiently large size to withstand collapse. A suitable particulate pore former is polyethylene.

Ceramic Compounds: Types

The ceramic material in the core suspension may be any ceramic compound known in the ceramic fiber or ceramic membrane art. While this ceramic material may also be an oxygen ion or proton mixed oxide conducting compound, it is not necessary to the invention. Typically, this ceramic material is the same one used in the sheath suspension or is chemically similar to or compatible with the one used in the sheath suspension in order to maintain adhesion between the core and sheath during formation of the green fiber and to reduce the risk of delamination of the sheath from the core during sintering of the green fiber.

The ceramic material in the sheath suspension may be any one of a wide variety of mixed oxide conducting materials that are known in the art as having the property of conducting oxygen or protons at elevated temperatures. These materials also conduct electrons so as to establish electronic charge neutrality.

When the hollow composite ceramic fibers are intended for the separation of oxygen from an oxygen-containing gas or for facilitating an oxidative reaction such as partial oxidation of light hydrocarbons such as methane, any one of a wide variety of oxygen-conducting mixed oxide oxygen ion conducting ceramics known in the art may be used in practice of the invention. A non-limiting list of typical ceramics suitable for use in the invention includes perovskites of formula (I):

$$[Ma_{1-x-u}Ma'_xMa''_u][Mb_{1-y-v}Mb'_yMb''_v]O_{3-\delta} \qquad (I)$$

in which:

Ma represents an atom chosen from scandium, yttrium, or from the families of lanthanides, actinides or alkaline-earth metals;

Ma', which is different from Ma, represents an atom chosen from scandium, yttrium or from the families of lanthanides, actinides or alkaline-earth metals;

Ma", which is different from Ma and Ma', represents an atom chosen from aluminum (Al), gallium (Ga), indium (In), thallium (Tl) or from the family of alkaline-earth metals;

Mb represents an atom chosen from transition metals;

Mb', which is different from Mb, represents an atom chosen from transition metals, aluminum (Al), indium (In), gallium (Ga), germanium (Ge), antimony (Sb), bismuth (Bi), tin (Sn), lead (Pb) and titanium (Ti);

Mb", which is different from Mb and Mb', represents an atom chosen from transition metals, alkaline-earth metals, aluminum (Al), indium (In), gallium (Ga), germanium (Ge), antimony (Sb), bismuth (Bi), tin (Sn), lead (Pb) and titanium (Ti);

$0<x\leq0.5$;
$0\leq u\leq0.5$;
$(x+u)\leq0.5$;
$0\leq y\leq0.9$;
$0\leq v\leq0.9$;
$0\leq(y+v)\leq0.9$; and δ is such that the structure in question is electrically neutral.

The ceramic material is more particularly chosen from compounds of formula (I) in which u is equal to zero or else from compounds of formula (I) in which u is different from zero or else from compounds of formula (I) in which the sum (y+v) is equal to zero or else from compounds of formula (I) in which the sum (y+v) is different from zero.

As a typical example of formula (I) as defined above, Ma is more particularly chosen from La, Ce, Y, Gd, Mg, Ca, Sr and Ba. In this case, the ceramic material is preferably a compound of formula (Ia):

$$La_{(1-x-u)}Ma'_xMa''_uMb_{(1-y-v)}Mb'_yMb''_vO_{3-\delta} \quad (Ia),$$

in which Ma represents a lanthanum atom.

In formula (I) as defined above, Ma' is more particularly chosen from La, Ce, Y, Gd, Mg, Ca, Sr and Ba. In this case, the ceramic material is preferably a compound of formula (Ib):

$$Ma_{(1-x-u)}Sr_xMa''_uMb_{(1-y-v)}Mb'_yMb''_vO_{3-\delta} \quad (Ib),$$

in which Ma' represents a strontium atom.

As another typical example of formula (I) as defined above, Mb is more particularly chosen from Fe, Cr, Mn, Co, Ni and Ti. In this case, the second ceramic compound is preferably a compound of formula (Ic):

$$Ma_{(1-x-u)}Ma'_xMa''_uFe_{(1-y-v)}Mb'_yMb''_vO_{3-\delta} \quad (Ic),$$

in which Mb represents an iron atom.

In formula (I) as defined above, Mb' is more particularly chosen from Co, Ni, Ti and Ga while Mb" is more particularly chosen from Ti and Ga.

The ceramic material may also be a compound of formula (Id):

$$La_{(1-x)}Sr_xFe_{(1-y)}Mb''_yO_{3-\delta} \quad (Id),$$

corresponding to formula (II) in which u=0, y=0, Mb represents an iron atom, Ma represents a lanthanum atom and Ma' represents a strontium atom. In formula (II) as defined above, Ma" is more particularly chosen from Ba, Ca, Al and Ga.

The ceramic material may also be a compound of formula: $La_{(1-x-u)}Sr_xAl_uFe_{(1-v)}Ti_vO_{3-\delta}$; $La_{(1-x-u)}Sr_xAl_uFe_{(1-v)}Ga_vO_{3-\delta}$; $La_{(1-x)}Sr_xFe_{(1-v)}Ti_vO_{3\delta}$; $La_{(1-x)}Sr_xTi_{(1-v)}Fe_vO_{3-\delta}$; $La_{(1-x)}Sr_xFe_{(1-v)}Ga_vO_{3-\delta}$ or $La_{(1-x)}Sr_xFeO_{3-\delta}$, where $La_{0.8}Sr_{0.2}Fe_{0.1}O_{3-\delta}$, $La_{0.8}Sr_{0.2}Fe_{0.08}Co_{0.2}O_{3-\delta}$, $La_{0.6}Sr_{0.4}Fe_{0.8}Co_{0.2}O_{3-\delta}$, $La_{0.6}Sr_{0.4}Fe_{0.9}Ga_{0.1}O_{3-\delta}$, $La_{0.8}Sr_{0.2}Fe_{0.7}Ga_{0.3}O_{3-\delta}$, or $La_{0.5}Sr_{0.5}Fe_{0.9}Ti_{0.1}O_{3-\delta}$ are most typical.

Another example of a ceramic material with a crystal structure of the perovskite type of formula (I) include those of formula (I'):

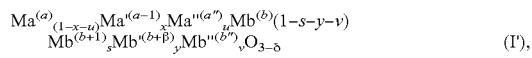

in which:

a, a−1, a", b, (b+1), (b+β) and b" are integers representing the respective valences of the Ma, Ma', Ma", Mb, Mb' and Mb" atoms; and a, a", b, b", β, x, y, s, u, v and δ are such that the electrical neutrality of the crystal lattice is preserved;

a>1;
a", b and b" are greater than zero;
$-2\leq\beta\leq2$;
a+b=6;
$0<s<X$;
$0<x\leq0.5$;
$0\leq u\leq0.5$;
$(x+u)\leq0.5$;
$0\leq y\leq0.9$;
$0\leq v\leq0.9$;
$0\leq(y+v+s)\leq0.9$;
$[u(a''-a)+v(b''-b)-x+s+\beta y+2\delta]=0$;
$\delta_{min}<\delta<\delta_{max}$;
$\delta_{min}=[u(a-a'')+v(b-b'')-\beta y]/2$;
$\delta_{max}=[u(a-a'')+v(b-b'')-\beta y+x]/2$; and Ma, Ma', Ma", Mb, Mb' and Mb" are as defined above, Mb representing an atom chosen from transition metals capable of existing in several possible valences.

The ceramic material may also be selected from one of the following formulae:

$La_zX_{1-z}FeO_{3-\delta}$ where $0<z<1.0$, X is Sr, Ca, or Ba, and δ is such that the formula is such that the electrical neutrality of the crystal lattice is preserved.

$Sm_zX_{1-z}FeO_{3-\delta}$ where $0<z<1.0$; X is Sr, Ca, or Ba, and δ is such that the formula is such that the electrical neutrality of the crystal lattice is preserved.

$(Sr(Co_{0.8}Fe_{0.2}))_{1-x}Ti_xO_{3-\delta}$ where x=0, 0.05, 0.1, 0.2, or 0.4, and δ is such that the formula is such that the electrical neutrality of the crystal lattice is preserved.

The ceramic material may also be in admixture with a metal or metal alloy to form a cermet, for example, a mixture of yttria stabilized zirconia (YSZ) or cerium gadolinium oxide (CGO) with Pt, Pd, a Pd/Ag alloy, a Pd/Au alloy, Ni, Nb, Ta, Nb, or V.

When the hollow composite ceramic fiber is intended for the separation of hydrogen from a hydrogen-containing gas, for the production of hydrogen and carbon dioxide from syngas, or for facilitation of a reductive reaction such as the production of longer-chain hydrocarbons from methane or the dehydrogenation of saturated hydrocarbons, any one of a wide variety of proton-conducting ceramics known in the art may be used in practice of the invention.

A non-limiting list of typical proton-conducting ceramics suitable for use in the invention include: several perovskite-type oxides based on $SrCeO_3$ or $BaCeO_3$, in which some trivalent cations are partially substituted for cerium according to the general formula of $SrCe_{1-x}M_xO_{3-\delta}$ or $BaCe_{1-x}M_xO_{3-\delta}$ where M is some rare earth element, x is less than its upper limit of solid solution formation range (usually less than 0.2) and δ is such that the compound is electrically neutral. Still other non-limiting, more particular examples include $SrCe_{0.95}Yb_{0.05}O_{3-\delta}$ (which is a solid solution based on the perovskite-type oxide SrCeO3, in which 5% of Ce is replaced by Yb); $BaCa_{1.18}Nb_{1.82}O_{3-\delta}$; $BaCe_{0.8}Gd_{0.2}O_{3-\delta}$; $BaCe_{0.90}Y_{0.1}O_{3-\delta}$; $Ce_{0.8}M_{0.2}O_{2-\delta}$ (M=La, Y, Ga, Sm);

$Li_2SO_4$; $La_{1.9}Ca_{0.1}Zr_2O_{6.95}$; $SrCe_{0.95}Yb_{0.05}O_{3-\delta}$; $SrZr_{0.90}Yb_{0.1}O_{3-\delta}$; and $SrZr_{0.90}Y_{0.1}O_{3-\delta}$. Other proton-conducting ceramic materials that are suitable include:

- $SrCe_zX_{1-z}O_{3-\delta}$ where $0<z<1.0$, X is Yb, Sc, Eu, Sm, Ho, Tm, Tb, or Y, and $\delta$ is such that the compound is electrically neutral;
- $BaCe_zX_{1-z}O_{3-\delta}$ where $0<z<1.0$, X is Nd, Ca, La, Y, Yb, Gd, Er, Zr, Zr & Na, Ru, or Y, and $\delta$ is such that the compound is electrically neutral;
- $SrZr_zX_{1-z}O_{3-\delta}$ where $0<z<1.0$, X is Yb, Y, In, Al, Gb, Rh or Y, and $\delta$ is such that the compound is electrically neutral;
- $CaZr_zIn_{1-z}O_{3-\delta}$ where $\delta$ is such that the compound is electrically neutral;
- $BaZr_zIn_{1-z}O_{3-\delta}$ where $\delta$ is such that the compound is electrically neutral; and
- $SrTi_zRu_{1-z}O_{3-\delta}$ where $\delta$ is such that the compound is electrically neutral.

As mentioned above, the ceramic material used in the core suspension may be any ceramic compound known in the ceramic fiber or ceramic membrane art. For example, it may be alumina, zirconia, or other ceramic materials, or mixtures of the foregoing. Typically, it is also a mixed oxide conducting material. It may also be any one of the ceramic materials mentioned above for use in the sheath suspension. Additionally, the ceramic materials of the core and sheath suspensions may be chose according to any of the above-described five embodiments or modifications thereof.

In one combination, the ceramic material of the core suspension is $La_{(1-x)}Sr_xFe_{(1-v)}Ga_vO_{3-\delta}$ (such as $La_{0.6}Sr_{0.4}Fe_{0.9}Ga_{0.1}O_{3-\delta}$) and the ceramic material of the sheath suspension is $La_{1-x}Sr_xFe_{1-y}Co_yO_{3-\delta}$ (such as $La_{0.7}Sr_{0.3}Fe_{0.8}Co_{0.2}O_{3-\delta}$ or $La_{0.6}Sr_{0.4}Fe_{0.8}Co_{0.2}O_{3-\delta}$). In another combination, the ceramic material of the core suspension is $La_{(1-x)}Sr_xFe_{(1-v)}Ga_vO_{3-\delta}$ (such as $La_{0.6}Sr_{0.4}Fe_{0.9}Ga_{0.1}O_{3-\delta}$), the ceramic material of the sheath suspension is $La_{1-x}Sr_xFe_{1-y}Co_yO_{3-\delta}$ (such as $La_{0.7}Sr_{0.3}Fe_{0.8}CO_{0.2}O_{3-\delta}$ or $La_{0.6}Sr_{0.4}Fe_{0.8}CO_{0.2}O_{3-\delta}$) and the sheath is formed from a blend of a minority of $La_{(1-x)}Sr_xFe_{(1-v)}Ga_vO_{3-\delta}$ (such as $La_{0.6}Sr_{0.4}Fe_{0.9}Ga_{0.1}O_{3-\delta}$) and a majority of $La_{1-x}Sr_xFe_{1-y}Co_yO_{3-\delta}$ (such as $La_{0.7}Sr_{0.3}Fe_{0.8}CO_{0.2}O_{3-\delta}$ or $La_{0.6}Sr_{0.4}Fe_{0.8}CO_{0.2}O_{3-\delta}$). In yet another combination, the ceramic material of the core suspension is $La_{(1-x)}Sr_xFe_{(1-v)}Ga_vO_{3-\delta}$ (such as $La_{0.6}Sr_{0.4}Fe_{0.9}Ga_{0.1}O_{3-\delta}$), the ceramic material of the sheath suspension is $La_{1-x}Sr_xFe_{1-y}Co_yO_{3-\delta}$ (such as $La_{0.7}Sr_{0.3}Fe_{0.8}Co_{0.2}O_{3-\delta}$ or $La_{0.6}Sr_{0.4}Fe_{0.8}Co_{0.2}O_{3-\delta}$), the core is formed from a blend of a majority of $La_{(1-x)}Sr_xFe_{(1-v)}Ga_vO_{3-\delta}$ (such as $La_{0.6}Sr_{0.4}Fe_{0.9}Ga_{0.1}O_{3-\delta}$) and a minority of $La_{1-x}Sr_xFe_{1-y}Co_yO_{3-\delta}$ (such as $La_{0.7}Sr_{0.3}Fe_{0.8}Co_{0.2}O_{3-\delta}$ or $La_{0.6}Sr_{0.4}Fe_{0.8}Co_{0.2}O_{3-\delta}$), and the sheath is formed from the same blend but with the minority and majority switched.

When the ceramic fiber is heated, a sufficiently large difference in coefficient of thermal expansion between the core and the sheath might cause delamination of the sheath from the core due to greater axial expansion of the core versus the sheath or of the sheath versus the core. This is called delamination. In order to reduce the tendency of the ceramic fiber to exhibit delamination, the sheath and core may be formed from ceramic materials that will result in an approximately identical coefficient of thermal expansion after sintering. Theoretically identical coefficients of thermal expansion may be obtained in the sheath and core by using the second ceramic material in each of the core and the sheath. Similar coefficients of thermal expansion may be obtained in the sheath and core by using a first ceramic material in the core that is chemically similar to the second ceramic material in the sheath. Alternatively, similar coefficients of thermal expansion may be obtained in the sheath and the core by using both the first and second ceramic materials in each of the core and sheath.

The particles of the ceramic material for use in the sheath suspension are typically produced by flame aerosol technology. Flame aerosol technology is the technology by which fine particles are produced from gases in a flame. Precursor compounds are injected into a burner as a gas, liquid droplets, or solid particles. The precursor compounds are a mixture of metal salts or metal oxides of the metals desirable in the final product ceramic. In order to obtain the desirable stoichiometric ratio in the ceramic material, the salts or oxides are present in the mixture according to the ratio of metals in the ceramic material. The liquid precursor quickly evaporates or the solid precursors quickly melt and evaporate. The resultant vapors are exposed to the high temperatures of the burner flame. The vapors form intermediates, product molecules, and clusters in the flame due to the high temperature, and quickly grow into nanosized particles.

Ceramic Compounds: Particle Sizes

The particle sizes of the ceramic material in the core suspension should be small enough to provide a relatively uniform dispersion of the particles in the suspensions from which the polymeric/inorganic precursor hollow fiber will be formed. It should also be small enough to obtain a relatively uniform distribution of the ceramic particles in the unsintered green fiber. Moreover, it should be small enough so that plugging of a spinnerette is avoided. Typically, the maximum particle size will not exceed one tenth of the narrowest gap in the spinnerette through which the suspension travels. The particle size is selected such that at least a highly dense layer in the unsintered green fiber is achieved.

However, the median particle size of the ceramic material in the core suspension should in any case be larger than that of the ceramic material in the sheath suspension. The relatively smaller median particle size of the ceramic material in the sheath suspension depresses the melting temperature of that ceramic material (in comparison to its bulk melting temperature) to a level at which the core may not be fully sintered. Where the ceramic materials used in the core and sheath suspensions are of the same formula, the difference in median particle size allows the sheath to be sintered at temperatures at which the core may not be fully sintered. Where the ceramic material used in the core suspension has a lower melting temperature (in bulk form) in comparison to the ceramic material used in the sheath suspension (in bulk form), a significant difference in median particle size between the two materials allows a depression in the melting temperature of the ceramic material of the sheath suspension that is significant enough to compensate for the higher melting temperature of the ceramic material of the core suspension (again in bulk form).

Typically, the median particle size of the ceramic material of the core suspension should be no less than 0.1 µm and up to 100 µm. More typically, they are no greater than about 4 µm. Another parameter of the particles of the ceramic material of the core suspension to keep in mind is the specific area which preferably is in the range of from 6-28 $m^2/g$.

An especially optimal particle size distribution for the ceramic material of the core suspension is one in which no particles exceed 3 µm in size and in which there are two groups of similarly sized particles, i.e., larger particles and smaller particles. This is desirable for achieving a relatively high degree of uniformity of packing and enhanced green density because the smaller sized particles fit in the otherwise empty spaces in between the larger sized particles.

Particles of ceramic material for the core suspension fitting the above-described size characteristics may be made by various techniques such as by choosing appropriate synthesis conditions and/or by physical size reduction methods well known to those of ordinary skill in the art, such as attrition milling, ball milling, wet-milling, and ultrasonication. When starting from hard agglomerates of a ceramic material, attrition milling may be used. Generally speaking, the best physical size reduction results are achieved when starting with inorganic particles having a generally round shape. This is typically the case for ceramic particles produced by spraying a solution of the ceramic precursor materials in a high temperature flame, for example 1,100° C., produced by an oxy-acetylene burner. A more rounded shape will provide greater, more uniform shearing during physical size reduction as well. Also, a more rounded shape tends to produce hollow composite fibers with fewer physical defects.

Appropriately sized ceramic particles for use in the core suspension may be calcined in order to remove undesirable substances adsorbed thereupon. Typically, this is performed by subjecting the particles to a temperature of 650° C. for 2 hours.

On the other hand, the particle sizes of the ceramic material for use in the sheath suspension are smaller than those of the ceramic material for use in the core suspension. Generally, the median particle size of the ceramic material for use in the sheath suspension is less than 1 µm. Typically, the median particle size is no greater than 100 nm. More typically, the median particle size is no greater than 75 nm. In any case, the median particle size should be small enough that, in combination with the difference between the bulk melting temperatures of the ceramic materials in the core and sheath suspensions, the sheath may be sintered at temperatures at which the core may not be fully sintered. Preferably, the combination of bulk melting temperature difference and particle size the unsintered sheath will result in complete or near complete melting of the ceramic particles in the sheath during sintering to form a dense separation layer without interconnecting voids.

Suspensions

The suspensions are typically prepared according to the following steps. The solvent, polymeric binder, and optional additive(s) for a given suspension are added to a high speed, high torque, thermal jacketed attrition mill and mixed. The ceramic material is then added then added in particulate form to the solvent/binder solution and further mixed.

Typically, the ceramic content of the suspension ranges from 65 to 80 wt. %, and the polymeric binder content ranges from 8 to 12 wt. %, with the remainder being solvent, and optional pore former, plasticizer and/or dispersant. More typically, the core suspension includes 70 to 75 wt. % of a ceramic material, while the sheath suspension includes 75-80 wt. % of a ceramic material. Typically, the weight ratio of ceramic material(s) to polymer ranges from about 7:1 to about 12:1. One of ordinary skill in the art will recognize that the upper concentration limit for ceramic material(s) in the suspension may be empirically determined without excessive experimentation by slightly varying the ceramic content and observing the fiber's ability to stay cohesive while being drawn. The upper limit will ultimately depend upon the specific compositions selected for the polymeric binder and ceramic material.

While sufficient mixing ordinarily will achieve uniform suspension of the binder, particulate ceramic material(s), and optional pore formers, incorporation of dispersing agent additives such as surfactants and polyelectrolytes also serve to facilitate and maintain uniform suspension. Other optional additives include one or more plasticizers.

Sintering

The dried, washed, wound, solidified fiber (i.e., the "green fiber") may be sintered in processing having two major steps to provide a sintered ceramic fiber. First, the green fiber is heated under conditions sufficient high to drive off or pyrolize the binder and optional pore former but not substantially sinter the ceramic materials in either the core or the sheath. Another term for this is burn-off. Second, the binderless green fiber is heated under conditions sufficient to sinter the particles of ceramic material in the sheath and densify the sheath to render it gas-tight, but not sufficient to fully sinter the first compound. As described above, these conditions are satisfied by using a ceramic material in the sheath with a suitable median particle size so as to depress the melting temperature of that ceramic material (in comparison to the melting temperature of that material in bulk form) to a sufficient level at which the core may not be fully sintered.

Confirmation of a gas-tight and densified sheath and non-gas-tight core may be confirmed by sintering fibers made only of the core and sintering fibers made of both the core and sheath, where the sintered core-only fiber will be non-gas-tight while the sintered core/sheath fiber will be gas-tight. This confirmation may be buttressed by imaging the sintered core/sheath fiber with a scanning electron microscope to verify the presence of an interconnecting network of pores (i.e., the core) and a densified sheath.

A typical temperature profile for sintering is as follows:
ramping the temperature from room temperature to 400° C. at a rate of 5° C./min;
ramping the temperature from 400° C. to 500° C. at a rate of 1° C./min;
dwell time of one hour at 500° C. to ensure complete burn-off;
ramping the temperature from 500° C. at a rate of 5° C./min to the temperature at which the sheath may be sintered but the core is not fully sintered—this will be driven by the bulk melting temperatures and particle sizes as described above; and
dwell time of two hours at the above-reached temperature.

The times, temperatures, and temperature ramp rates in the sintering cycle may be optimized based upon the particular polymeric binder, types of ceramic materials used as well as the particle sizes of the particulate ceramic materials. Thermogravimetric analysis of the organic material may be performed in a manner well known to those skilled in the art to establish the times, temperatures, and temperature ramp rates for the organics burn-off phase of the sintering cycle. Also, generally speaking a relatively small particle size of the inorganic material (and associated high surface area) tends to inhibit removal of the organic material, so in such a case the temperature ramp rates should be relatively lower and the dwell times increased. On the other hand, in the sintering phase, a relatively small particle size (and associated high surface area) will tend to increase the speed of sintering, so the dwell times in such a case should be relatively lower. Dilatometry analysis (also called thermal expansion analysis) of the green fiber may be performed in a manner well known to those skilled in the art to establish, in routine fashion, the times, temperatures, and temperature ramp rates for the sintering phase of the sintering cycle. In such analysis, the size of a piece of the green fiber is recorded as the temperature is raised. The initiation of sintering is indicated when a very fast decrease of the sample size is recorded.

Upon completion of sintering, the sheath, and therefore the fiber, is gas-tight. The term "gas-tight" means that if the interior of the fiber is pressurized, no escape of the pressurization gas from the external circumferential surface of the fiber can be detected. On the other hand, the core has an interconnecting network of pores and is not gas-tight.

Gas Separation Membrane Module

As best illustrated in the FIG, a gas separation membrane module is the so-called "double-ender" type with a zoomed-in portion illustrating the gas separation at the fiber level. The module that includes a plurality of sintered hollow ceramic fibers 1 extending between an upstream tubesheet 3 and a downstream tubesheet (not illustrated) disposed adjacent corresponding upstream and downstream ends of a cylindrically shaped housing 5 as is conventionally known in the gas separation membrane field. The housing 5 has an upstream bore-side port 7 formed at one end and downstream bore-side port 9 at the other end. The housing 5 also has a shell-side port 11 extending from the shell side of the housing 5.

In operation, a flow of feed gas 2 is fed to bore-side port 7. It then flows into the fibers 1 via open upstream ends thereof. Inside the bores of the fibers 1, molecular oxygen or hydrogen (as the case may be) in the feed gas flows through the interconnecting network of pores in the core and dissociates into oxygen anions ($O^{2-}$) or into protons and electrons, respectively, at the interface of the core and sheath. The oxygen anions or protons (as the case may be) are transported through the sheath to an outer surface of the sheath where they reform as molecular oxygen or hydrogen, respectively, to form a permeate gas 4. The remaining portion of the feed gas travels down the bores of the fibers 1 and out the open downstream ends thereof to form the non-permeate gas 6. The permeate gas 4 is collected from shell-side port 11 while the non-permeate gas 6 is collected from bore-side port 9.

In an alternative arrangement of the "double-ender" module, the feed gas may instead be fed to shell-side port 11, the non-permeate gas 6 may be collected from another shell-side port (not illustrated) disposed on an opposite end of the housing in between the tubesheets, and the permeate gas 4 may be collected from bore-side port 9. A sweep gas may be introduced into bore-side port 7 to lower the partial pressure of the oxygen or hydrogen accumulating on the inside the fibers 1 in order to increase the flux through the fibers 1. If no sweep gas is desired, either or both of port 7 and port 9 can be utilize to collect the permeate gas 6.

Alternatively, the module may be of the so-called "single-ender" type where only the upstream ends of the fibers 1 are open and the downstream closed ends of the fibers 1 terminate in a space defined by inner surfaces of the housing. In this alternative case, there is no need for a downstream tubesheet or a downstream bore-side port. The feed gas is introduced into an interior of the housing 5 adjacent the closed ends of the fibers 1 via shell-side port 11. In this case, no non-permeate gas need be collected or it can be collected from another shell-side port disposed on an opposite end of the housing 5. The permeate gas is collected from the bore-side port 7.

The so-called "single-ender" type of module may be used as an oxidative or reductive reactor whereby a feed gas of oxygen or hydrogen is reacted with another reactant such as a hydrocarbon fuel (i.e., methane) or unsaturated hydrocarbons (i.e., alkenes or alkynes). In this case, the feed gas is an oxygen or hydrogen containing gas (as the case may be). The feed gas is the first reactant. The second reactant is introduced into the bore-side port 7. The first and second reactants react on the inner surface of the core to form reaction products. A flow of reaction product is then collected from bore-side port 9.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A process for making a composite hollow ceramic fiber, comprising the steps of:
   preparing a core suspension comprising a first polymeric binder, a first particulate ceramic material, and a first solvent;
   preparing a sheath suspension comprising a second polymeric binder, a second particulate ceramic material, and a second solvent;
   providing a spinnerette adapted and configured to continuously extrude one or more nascent hollow fibers comprising a hollow core formed from the core suspension and a sheath surrounding the core formed from the sheath suspension;
   immersing the nascent hollow fiber in a liquid coagulant to facilitate phase inversion of the first and second polymeric binders, wherein:
   the second particulate ceramic material comprises a mixed oxide conductor;
   the second particulate ceramic material has a median particle size less than that of the first particulate ceramic material;
   the first and second particulate ceramic materials are chemically identical;
   the first and second solvents are the same or different; and
   the first and second polymeric binders are the same or different.

2. The process of claim 1, wherein the second particulate ceramic material in the sheath suspension has a median particle size of less than 100 nm.

3. The process of claim 1, wherein the second particulate ceramic material in the sheath suspension has a median particle size of no greater than 75 nm.

4. The process of claim 1, wherein:
   the core suspension further comprises an amount of the second particulate ceramic material;
   the second particulate ceramic material of the core suspension has a median particle size greater than that of the second particulate ceramic material of the sheath suspension such that the second particulate ceramic material of the sheath suspension is sinterable at a temperature less than that of the second particulate ceramic material of the core suspension.

5. The process of claim 4, wherein:
   the median particle size of the first particulate ceramic material of the core suspension is no less than 100 nm;
   the median particle size of the second particulate ceramic material of the core suspension is no less than 100 nm; and
   the median particle size of the second particulate ceramic material of the sheath suspension is no greater than 75 nm.

6. The process of claim 1, wherein:
   the sheath suspension further comprises an amount of the first particulate ceramic material;
   the first particulate ceramic material of the sheath suspension has a median particle size less than that of the first particulate ceramic material of the core suspension such that the first particulate ceramic material of the sheath suspension is sinterable at a temperature less than that of the first particulate ceramic material of the core suspension.

7. The process of claim 6, wherein
the median particle size of the first particulate ceramic material of the core suspension is no less than 100 nm;
the median particle size of the first particulate ceramic material of the sheath suspension is no greater than 75 nm; and
the median particle size of the second particulate ceramic material of the sheath suspension is no greater than 75 nm.

8. The process of claim 1, wherein:
the core suspension further comprises an amount of the second particulate ceramic material;
the sheath suspension further comprises an amount of the first particulate ceramic material;
the first particulate ceramic material of the sheath suspension has a median particle size less than that of the first particulate ceramic material of the core suspension such that the first particulate ceramic material of the sheath suspension is sinterable at a temperature less than that of the first particulate ceramic material of the core suspension; and
the second particulate ceramic material of the core suspension has a median particle size greater than that of the second particulate ceramic material of the sheath suspension such that the second particulate ceramic material of the sheath suspension is sinterable at a temperature less than that of the second particulate ceramic material of the core suspension.

9. The process of claim 8, wherein:
the median particle sizes of the first and second particulate ceramic materials of the core suspension is no less than 100 nm; and
the median particle size of the first and second particulate ceramic materials of the sheath suspension is no greater than 75 nm.

10. The process of claim 1, wherein the sheath suspension comprises about 64 wt. % to about 80 wt. % of the particles of the second particulate ceramic material and about 8 wt. % to about 12 wt. % of the second polymeric binder.

11. The process of claim 1, further comprising the step of passing the nascent hollow fiber from the spinnerette through an air gap.

12. The process of claim 1, wherein the core suspension further comprises pore formers insoluble in the first solvent.

13. The process of claim 1, wherein the mixed oxide conductor comprises a hydrogen conducting mixed oxide conductor.

14. The process of claim 1, wherein the mixed oxide conductor is an oxygen conducting mixed oxide conductor.

15. The process of claim 14, wherein the oxygen conducting mixed oxide conductor is a perovskite independently selected from formula (I):

$$[Ma_{1-x-u}Ma'_xMa''_u][Mb_{1-y-v}Mb'_yMb''_v]O_{3-\delta} \quad (I)$$

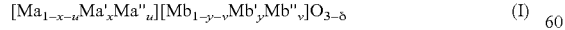

in which:
Ma represents an atom chosen from scandium, yttrium, or from the families of lanthanides, actinides or alkaline-earth metals;
Ma', which is different from Ma, represents an atom chosen from scandium, yttrium or from the families of lanthanides, actinides or alkaline-earth metals;
Ma", which is different from Ma and Ma', represents an atom chosen from aluminum (Al), gallium (Ga), indium (In), thallium (Tl) or from the family of alkaline-earth metals;
Mb represents an atom chosen from transition metals;
Mb', which is different from Mb, represents an atom chosen from transition metals, aluminum (Al), indium (In), gallium (Ga), germanium (Ge), antimony (Sb), bismuth (Bi), tin (Sn), lead (Pb) and titanium (Ti);
Mb", which is different from Mb and Mb', represents an atom chosen from transition metals, alkaline-earth metals, aluminum (Al), indium (In), gallium (Ga), germanium (Ge), antimony (Sb), bismuth (Bi), tin (Sn), lead (Pb) and titanium (Ti);
$0<x\leq0.5$;
$0\leq u\leq0.5$;
$(x+u)\leq0.5$;
$0\leq y\leq0.9$;
$0\leq v\leq0.9$;
$0\leq(y+v)\leq0.9$; and
$\delta$ is such that the structure in question is electrically neutral.

16. The process of claim 15, wherein the second particulate ceramic material is $La_{1-x}Sr_xFe_{1-y}Co_yO_{3-\delta}$.

17. The process of claim 16, wherein the second particulate ceramic material is $La_{0.7}Sr_{0.3}Fe_{0.8}Co_{0.2}O_{3-\delta}$ or $La_{0.6}Sr_{0.4}Fe_{0.8}Co_{0.2}O_{3-\delta}$.

18. The process of claim 1, wherein each of the first and second particulate ceramic materials is a perovskite selected from formula (I):

$$[Ma_{1-x-u}Ma'_xMa''_u][Mb_{1-y-v}Mb'_yMb''_v]O_{3-\delta} \quad (I)$$

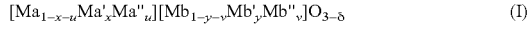

in which:
Ma represents an atom chosen from scandium, yttrium, or from the families of lanthanides, actinides or alkaline-earth metals;
Ma', which is different from Ma, represents an atom chosen from scandium, yttrium or from the families of lanthanides, actinides or alkaline-earth metals;
Ma", which is different from Ma and Ma', represents an atom chosen from aluminum (Al), gallium (Ga), indium (In), thallium (Tl) or from the family of alkaline-earth metals;
Mb represents an atom chosen from transition metals;
Mb', which is different from Mb, represents an atom chosen from transition metals, aluminum (Al), indium (In), gallium (Ga), germanium (Ge), antimony (Sb), bismuth (Bi), tin (Sn), lead (Pb) and titanium (Ti);
Mb", which is different from Mb and Mb', represents an atom chosen from transition metals, alkaline-earth metals, aluminum (Al), indium (In), gallium (Ga), germanium (Ge), antimony (Sb), bismuth (Bi), tin (Sn), lead (Pb) and titanium (Ti);
$0<x\leq0.5$;
$0\leq u\leq0.5$;
$(x+u)\leq0.5$;
$0\leq y\leq0.9$;
$0\leq v\leq0.9$;
$0\leq(y+v)\leq0.9$; and
$\delta$ i is such that the structure in question is electrically neutral.

19. The process of claim 1, wherein the core suspension further comprises pore formers having a particle size of 5 to 50 μm.

20. The process of claim 1, wherein the composite hollow fiber has an outer diameter of 150-6,000 μm, an inner diameter of 50-2,000 μm, a core thickness of 50-2,000 μm, and a sheath thickness of 3-70 μm.

21. The process of claim 20, wherein the composite hollow fiber has an outer diameter of 1,300-2,850 μm and a combined core and sheath thickness of 260-1,000 μm.

22. A composite hollow fiber produced by the process of claim 1.

23. A method of making a composite hollow ceramic fiber, comprising the steps of:
heating the composite hollow fiber of claim 22 under conditions sufficient to drive off the first and second polymeric binders; and
heating the binderless composite hollow fiber under conditions sufficient to densify the sheath to gas-tightness and sinter the second particulate ceramic material but not fully sinter the core.

24. A composite hollow ceramic fiber produced by the method of claim 23.

25. The composite hollow ceramic fiber of claim 24, wherein an outside diameter of the composite hollow ceramic fiber is in a range from about 900 to 2,000 μm and a ratio of the outside diameter of the composite hollow ceramic fiber to an inside diameter of the composite hollow ceramic fiber is in a range of from about 1.20:1.0 to about 3.0:1.0.

26. The composite hollow ceramic fiber of claim 24, wherein the core has an interconnecting network of pores.

\* \* \* \* \*